(12) United States Patent
Sirak et al.

(10) Patent No.: US 9,580,529 B2
(45) Date of Patent: Feb. 28, 2017

(54) PREPARATION OF LOW-VISCOSITY POLYMERS

(71) Applicants: Sofia M Sirak, Frankfurt (DE); Christopher Paul Radano, West Chester, PA (US)

(72) Inventors: Sofia M Sirak, Frankfurt (DE); Christopher Paul Radano, West Chester, PA (US)

(73) Assignee: EVONIK OIL ADDITIVES GmbH, Darmstadt (DE)

( * ) Notice: Subject to any disclaimer, the term of this patent is extended or adjusted under 35 U.S.C. 154(b) by 0 days.

(21) Appl. No.: 14/439,804

(22) PCT Filed: Dec. 19, 2013

(86) PCT No.: PCT/EP2013/077323
§ 371 (c)(1),
(2) Date: Apr. 30, 2015

(87) PCT Pub. No.: WO2014/106587
PCT Pub. Date: Jul. 10, 2014

(65) Prior Publication Data
US 2015/0291717 A1 Oct. 15, 2015

Related U.S. Application Data

(60) Provisional application No. 61/749,091, filed on Jan. 4, 2013.

(30) Foreign Application Priority Data

Jan. 29, 2013 (EP) .................................... 13152972

(51) Int. Cl.
| | | |
|---|---|---|
| *C08F 220/00* | (2006.01) | |
| *C08F 220/18* | (2006.01) | |
| *C08F 222/10* | (2006.01) | |
| *C08F 20/18* | (2006.01) | |
| *C08F 20/68* | (2006.01) | |
| *C08F 2/38* | (2006.01) | |
| *C08F 10/14* | (2006.01) | |
| *C08L 23/24* | (2006.01) | |
| *C08L 33/06* | (2006.01) | |
| *C10M 107/28* | (2006.01) | |

(Continued)

(52) U.S. Cl.
CPC .............. *C08F 222/10* (2013.01); *C08F 2/38* (2013.01); *C08F 10/14* (2013.01); *C08F 20/18* (2013.01); *C08F 20/68* (2013.01); *C08F 220/18* (2013.01); *C08L 23/24* (2013.01); *C08L 33/06* (2013.01); *C10M 107/10* (2013.01); *C10M 107/28* (2013.01); *C10M 145/14* (2013.01); *C10M 2209/0845* (2013.01); *C10N 2220/021* (2013.01); *C10N 2220/022* (2013.01); *C10N 2220/023* (2013.01); *C10N 2220/033* (2013.01)

(58) Field of Classification Search
CPC ......... C08F 4/7081; C08F 4/7096; C08F 4/40; C08F 2/38; C08F 220/18
See application file for complete search history.

(56) References Cited

U.S. PATENT DOCUMENTS

| | | | | |
|---|---|---|---|---|
| 4,680,352 A | * | 7/1987 | Janowicz | ................... C08F 2/38 526/120 |
| 4,694,054 A | * | 9/1987 | Janowicz | ................... C08F 2/38 526/120 |

(Continued)

FOREIGN PATENT DOCUMENTS

| | | |
|---|---|---|
| DE | 103 14 776 A1 | 10/2004 |
| WO | WO 01/40333 A1 | 6/2001 |

(Continued)

OTHER PUBLICATIONS

N. S. Enikolopyan et al., "Catalyzed Chain Transfer to Monomer in Free Radical Polymerization", Journal of Polymer Science: Polymer Chemistry Edition, vol. 19, 1981, pp. 879-889.
P. Gosh et al., "Alkyl Methacrylate: α-Olefin Copolymers as Viscosity Modifier Additives in Lubricants", Indian Journal of Chemical Technology, vol. 5, Nov. 1998, pp. 371-375.
International Search Report and Written Opinion issued Apr. 24, 2014 in PCT/EP2013/077323 Filed Dec. 19, 2013.
Extended European Search Report issued Jul. 3, 2013 in Patent Application No. 13152972.9 Filed Jan. 29, 2013.

Primary Examiner — Rip A Lee
(74) Attorney, Agent, or Firm — Oblon, McClelland, Maier & Neustadt, L.L.P.

(57) ABSTRACT

The present invention relates to a method for preparing a polymer composition, said method comprising the steps of: a) preparing a reaction mixture comprising as component A) an ethylenically unsaturated monomer or a mixture of ethylenically unsaturated monomers and as component B) a 1-alkene or a mixture of 1-alkenes; b) adding a Co(II) complex as a catalytic chain transfer agent to the reaction mixture; c) adding a radical initiator; and d) reacting the reaction mixture to obtain the polymer composition, wherein the total amount of the radical initiator added to the reaction mixture is at least 0.05% by weight relative to the total weight of components A) and B). The present invention also relates to the use of a Co(II) complex as catalytic chain transfer agent for the polymerization of a reaction mixture comprising an ethylenically unsaturated monomer or a mixture of ethylenically unsaturated monomers, a radical initiator, and a 1-alkene or a mixture of 1-alkenes, wherein the total amount of the radical initiator added to the reaction mixture is at least 0.05% by weight relative to the total weight of the ethylenically unsaturated monomer or mixture of ethylenically unsaturated monomers and the 1-alkene or mixture of 1-alkenes.

14 Claims, No Drawings

(51) Int. Cl.
*C10M 145/14* (2006.01)
*C10M 107/10* (2006.01)

(56) References Cited

U.S. PATENT DOCUMENTS

| | | | | |
|---|---|---|---|---|
| 4,722,984 A | * | 2/1988 | Janowicz | C08F 2/38 526/123.1 |
| 4,886,861 A | * | 12/1989 | Janowicz | C08F 2/38 526/145 |
| 5,602,220 A | * | 2/1997 | Haddleton | C08F 10/00 526/172 |
| 5,684,101 A | * | 11/1997 | Muir | C08F 2/38 526/172 |
| 5,691,284 A | | 11/1997 | Beyer et al. | |
| 5,726,263 A | * | 3/1998 | Gridnev | C08F 6/001 526/120 |
| 5,770,665 A | * | 6/1998 | Haddleton | C08F 2/38 526/131 |
| 5,942,642 A | * | 8/1999 | Beyer | C08F 2/06 560/193 |
| 6,403,745 B1 | * | 6/2002 | Scherer | C08F 220/12 526/317.1 |
| 6,624,261 B1 | * | 9/2003 | Moad | C08F 2/38 526/140 |
| 2006/0189490 A1 | | 8/2006 | Dardin et al. | |
| 2007/0142546 A1 | | 6/2007 | Ittel et al. | |
| 2008/0113886 A1 | | 5/2008 | Kinker et al. | |
| 2009/0012231 A1 | | 1/2009 | Ittel et al. | |
| 2011/0162723 A1 | | 7/2011 | Placek et al. | |
| 2014/0275460 A1 | * | 9/2014 | Tamareselvy | C08F 226/10 526/264 |

FOREIGN PATENT DOCUMENTS

| WO | WO 2008/058774 A1 | 5/2008 |
|---|---|---|
| WO | WO 2010/043503 A1 | 4/2010 |
| WO | WO 2012/076676 A1 | 6/2012 |

\* cited by examiner

PREPARATION OF LOW-VISCOSITY POLYMERS

The present invention relates to a method for the preparation of low-viscosity polymers suitable as base fluids for lubricants based on a mixture of polar and non-polar building blocks. The method comprises polymerizing a reaction mixture of 1-alkenes and ethylenically unsaturated monomers in the presence of a cobalt catalytic chain transfer agent.

The present invention relates to the field of lubrication. Lubricants typically contain a base fluid and variable amounts of additives. A good lubricant should possess a high boiling and low freezing point, a high viscosity index, good thermal stability, low susceptibility to corrosion, and a high resistance to oxidation. These properties are significantly determined by the additives used. Therefore, a base fluid that can support a broad variety of additives is needed to improve the overall performance of the lubricant.

According to the American Petroleum Institute (API) lubricant base fluids are subdivided into different groups. Groups I to III encompass different mineral oils distinguished by their degree of saturation, sulphur content, and viscosity index. Group IV encompasses polyalphaolefins. Group V encompasses all other base fluids including napthenics, polyalkylene glycol oils, and esters. Base fluids for lubricants may especially be oils having a kinematic viscosity in the range of 3 to 100 $mm^2/s$, preferably 13 to 65 $mm^2/s$ measured at 40° C. according to ASTM D 445.

The term mineral oil commonly refers to oils derived from crude oil fractions. Mineral oils of groups I to III are therefore regarded as native oils. In contrast, base fluids of groups IV and V are regarded as synthetic base fluids.

Synthetic base fluids are growing in interest and are preferred over mineral oils due to their greater oxidative and chemical stability, improved viscosity index and reduced pour point. Further, their properties may be systematically controlled during synthesis to optimize the structure-property profile of the base fluids. Due to their synthesis from relatively pure raw material, synthetic base fluids also contain fewer unwanted by-products with deleterious effects.

Polyalphaolefins (PAOs) are polymers of 1-alkenes (alpha olefins), for example 1-decene. PAOs have a flexible alkyl side chain on every other carbon atom of the polymer backbone. Due to the large number and high conformational variability of the alkyl side chains, PAOs do not crystallize or solidify easily and remain viscous liquids even at low temperatures. Further, PAOs offer a high oxidative and chemical stability, and can be produced by well-developed synthetic processes. Therefore, PAOs find widespread use in engine oil, transmission oil, industrial gear oil, and hydraulic oil applications. However, PAOs are inherently non-polar and are therefore incompatible with polar additives, such as viscosity modifiers.

Ester oils are group V base fluids that may have superior solubility, additive compatibility and viscosimetrics compared to PAOs. However, ester oils are susceptible to hydrolysis, leading to a fluid with greater potential to induce corrosion.

Polymers based on a mixture of polar and non-polar buildings blocks, such as methacrylate and alpha olefins, potentially combine the benefits of PAOs and ester oils. The methacrylate component may provide polarity to the polymer, while the alpha olefin component may help maintaining the miscibility with common mineral oil and non-polar synthetic oils.

Gosh et al. have demonstrated the synthesis of high molecular weight polymers from iso-decyl methacrylate and 1-decene (P. Gosh et al., Indian Journal of Chemical Technology, 1998, vol. 5, pp. 371-375). These polymers incorporated up to 13% of 1-decene into the backbone using standard free radical initiators (e.g. AIBN) and solvent. The polymers were shown to be suitable as viscosity modifiers when used at low concentrations as additives for engine oils. However, because these polymers are of high molecular weight and high viscosity, they are susceptible to significant viscosity loss upon mechanical shearing. Thus, their high viscosity precludes their use as base fluids to dissolve other viscosity modifiers.

Further, due to the low concentrations these polymers are used at, they do not offer the ability to adjust the fluid polarity in formulations.

U.S. Pat. No. 5,691,284 discloses the synthesis of polymers from (meth)acrylic acid esters and alpha olefins. However, the method disclosed in U.S. Pat. No. 5,691,284 does not yield polymers with a kinematic viscosity lower than 25 $mm^2/s$ at 100° C. according to ASTM D 445. In light of the fact that low viscosity base fluids are needed as engine oils to achieve a high fuel efficiency in combustion engines, an even lower viscosity is desired. Further, the synthesis of low viscosity polymers disclosed in U.S. Pat. No. 5,691,284 requires at least 4% of free radical initiator. This high amount of free radical initiator results in a high concentration of potentially corrosive by-products. Another detriment is the large amount of alpha olefins required to achieve a low viscosity. Such large incorporation of alpha olefin offsets the benefit of achieving a fluid whose polarity can be tuned through the incorporation of different (meth)acrylic acid esters. Finally, because of the different reactivity of (meth) acrylic acid esters and alpha olefins, long reaction times are required. This results in an impractical process for generating base fluids within standard manufacturing processes.

Catalytic chain transfer (CCT) is a process which involves adding a catalytic chain transfer agent to a radical polymerization reaction to achieve greater control over the length of the resulting polymers. It is known that cobalt porphyrins can be used as catalytic chain transfer agents in the polymerization of methyl-methacrylate to reduce the molecular weight of the resulting poly-methyl-methacrylate (N. S. Enikolopyan et al., Journal of Polymer Science: Polymer Chemistry Edition, 1981, vol. 19, pp. 879-889).

US 2009/0012231 A1 discloses macromonomers synthesized by cobalt-catalyzed chain transfer free radical polymerizations of (meth)acrylic monomers. It further discloses the preparation of a pigment dispersion from the reaction of said macromonomers with monomeric or oligomeric amines. However, US 2009/0012231 A1 does not relate to the synthesis of low-viscosity polymers.

U.S. Pat. No. 4,680,352 discloses the use of different Co(II) chelates as catalytic chain transfer agents for controlling the molecular weight of homopolymers and copolymers produced in free radical polymerization processes. In particular, U.S. Pat. No. 4,680,352 relates to the polymerization of (meth)acrylic acid ester monomers and styrene monomers.

In order to reduce the kinematic viscosity of a lubricating oil composition, a standard method well-known in the art consists in making a dilution of the viscosity improver in a base oil.

DE 10314776A1 relates to a lubricating oil composition having a lubricating oil and at least one additive having friction-reducing properties. The viscosity improver is prepared by ATRP polymerization of monomer compositions, wherein the catalyst comprises at least one transition metal, so that the transition metal compound can form a redox cycle with the initiator or the polymer chain which has a transferable atom group. As stated in DE 10314776A1, in these cycles, the transferable atom group and the catalyst reversibly form a bond, and the oxidation state of the transition metal is increased or lowered. Cobalt is cited as a possible transition metal. The different VI improvers prepared according to the process disclosed in DE 10314776A1 are dissolved in a paraffinic base oil in order to lower/adjust their kinematic viscosity.

A similar polymerization process based on an ATRP polymerization (Transition metal-mediated living radical polymerization) is also described in WO 01/40333A1. Gradient copolymers are prepared by a ATRP method, wherein the monomers are polymerized by means of initiators by the formula Y—(X)$_m$, wherein Y represents the case molecule, of which it is assumed that it forms radicals, X represents a transferable atom. It is indicated that the addition of a transition metal compound in presence of a ligand to the transferable atomic group facilitates the polymerization process, resulting in polymers having a narrow molecular weight distribution. Cobalt is mentioned as a possible transition metal, although the transition metal usually used is copper. The resulting polymers are then diluted with a group I or group II mineral oil to lower their kinematic viscosity. WO 2010/043503 discloses a method for reducing noise in a hydraulic system by contacting a hydraulic fluid comprising a polyalkyl(meth)acrylate polymer. As indicated in WO 2010/043503, in order to achieve a prescribed ISO viscosity grade, a base stock having a low viscosity grade is mixed with the poylalkyl(meth)acrylate polymer, said base stock being a mineral oil and/or a synthetic oil.

WO 2012/076676A1 relates to a VI improver comprising a polyalkyl(meth)acrylate polymer, wherein the viscosimetric determined values of the different VI improver is made after dilution in a Group III mineral oil.

WO 2008/058774 relates to method for controlling the quality of a functional fluid, wherein a metal compound is added as a marker to the functional fluid to detect the functional fluid in a mixture. As indicated in WO 2008/058774, the metal compound, which can be Cobalt, should have no detrimental effect to the functional fluid or to the equipment hardware in which the functional fluid is used.

The present invention aims at providing an improved method for the preparation of low viscosity polymers from ethylenically unsaturated monomers, preferably (meth) acrylic acid esters. The polymers prepared should preferably have a kinematic viscosity of less than 25 mm$^2$/s measured at 100° C. according to ASTM D 445. Further, the method should require low amounts of free radical initiator and should allow to tailor the polarity of the polymers through (meth)acrylate side chain functionality. Additionally, the polymers should have superior viscosity indices and comparable volatilities when compared to state of the art base fluids. The present invention also aims at providing a method for preparing said polymers under short reaction times and with minimal by-products.

In the context of the present invention, the term "(meth) acrylic" refers to either acrylic or to methacrylic, or mixtures of acrylic and methacrylic. Correspondingly, the term "(meth)acrylate" refers to either acrylate or to methacrylate, or mixtures of acrylate and methacrylate.

In a first aspect, the present invention relates to a method for preparing a polymer composition having a kinematic viscosity of less than 25 mm$^2$/s measured at 100° C. according to ASTM D 445. This method comprises the steps of:

a) preparing a reaction mixture comprising as component A) an ethylenically unsaturated monomer or a mixture of ethylenically unsaturated monomers and as component B) a 1-alkene or a mixture of 1-alkenes;
b) adding a Co(II) complex as a catalytic chain transfer agent to the reaction mixture;
c) adding a radical initiator; and
d) reacting the reaction mixture to obtain the polymer composition, wherein the total amount of the radical initiator added to the reaction mixture is at least 0.05% by weight relative to the total weight of components A) and B).

Optionally, the method further comprises after step d) an additional step of distilling off the residual 1-alkene.

The method is based on a catalytic chain transfer (CCT) process, which means that it involves adding a catalytic chain transfer agent to a radical polymerization reaction.

It has been found that with the inventive method, polymers of a kinematic viscosity of less than 25 mm$^2$/s, preferably less than 20 mm$^2$/s, more preferably less than 15 mm$^2$/s measured at 100° C. according to ASTM D 445 can be prepared.

The reaction mixture prepared in step a) preferably comprises at least 50% by weight of component A) relative to the total weight of components A) and B). The reaction mixture prepared in step a) also preferably comprises at least 10% by weight of component B) relative to the total weight of components A) and B). Most preferably the reaction mixture prepared in step a) comprises 50 to 90% by weight of component A) and 10 to 50% by weight of component B) relative to the total weight of components A) and B).

In a preferred embodiment, component A) consists of a compound according to formula (I) or a mixture of compounds according to formula (I)

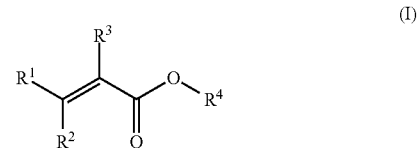

(I)

wherein R$^1$ and R$^2$ independently represent a hydrogen atom or a group of the formula —COOR$^5$, R$^3$ represents a hydrogen atom or a methyl group, R$^4$ represents a C$_1$ to C$_{30}$ alkyl group, a C$_2$ to C$_{30}$ alkenyl group, a C$_2$ to C$_{30}$ alkinyl group or a C$_3$ to C$_{30}$ cycloalkyl group, and R$^5$ represents a hydrogen atom or a C$_1$ to C$_{30}$ alkyl group, a C$_2$ to C$_{30}$ alkenyl group, or a C$_2$ to C$_{30}$ alkinyl group.

In a particularly preferred embodiment, R$^1$ and R$^2$ represent hydrogen atoms, R$^3$ represents a hydrogen atom or a methyl group, and R$^4$ represents a C$_1$ to C$_{30}$ alkyl group, preferably a C$_6$ to C$_{15}$ alkyl group, even more preferably a C$_{10}$ to C$_{15}$ alkyl group, most preferably a C$_{12}$ alkyl group.

In the context of the present invention, these preferred compounds are also called "C$_n$ (meth)acrylic acid ester" or "C$_n$ (meth)acrylate", referring to compounds according to formula (I), wherein R$^1$ and R$^2$ represent hydrogen atoms, R$^3$ represents a hydrogen atom or a methyl group, and R$^4$ represents a C$_n$ alkyl group.

In another preferred embodiment, component A) comprises a mixture of C$_1$ to C$_{30}$ (meth)acrylic acid esters, more preferably a mixture of C$_{10}$ to C$_{15}$ (meth)acrylic acid esters. In the context of the present invention, the terms "a mixture of C$_n$ to C$_m$ (meth)acrylic acid esters" or "a mixture of C$_n$ to $C_m$ (meth)acrylates" refer to a mixture of compounds according to formula (I), wherein $R^1$ and $R^2$ represent hydrogen atoms, $R^3$ represents a hydrogen atom or a methyl group, and $R^4$ represents different $C_n$ to $C_m$ alkyl groups.

In another preferred embodiment, component A) is a mixture comprising as component A1) a compound according to formula (II) or a mixture of compounds according to formula (II)

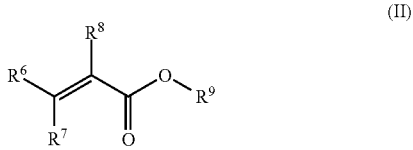

wherein $R^6$ and $R^7$ independently represent a hydrogen atom or a group of the formula —COOR$^{10}$, $R^8$ represents a hydrogen atom or a methyl group, $R^9$ represents a $C_1$ to $C_5$ alkyl group, a $C_2$ to $C_5$ alkenyl group, a $C_2$ to $C_5$ alkinyl group or a $C_3$ to $C_5$ cycloalkyl group, and $R^{10}$ represents a hydrogen atom or a $C_1$ to $C_5$ alkyl group, a $C_2$ to $C_5$ alkenyl group, or a $C_2$ to $C_5$ alkinyl group; as component A2) a compound according to formula (III) or a mixture of compounds according to formula (III)

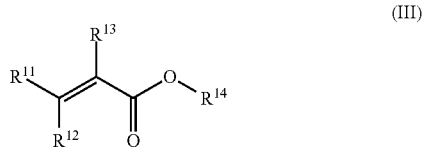

wherein $R^{11}$ and $R^{12}$ independently represent a hydrogen atom or a group of the formula —COOR$^{15}$, $R^{13}$ represents a hydrogen atom or a methyl group, $R^{14}$ represents a $C_6$ to $C_{15}$ alkyl, alkenyl, or alkinyl group or a $C_6$ to $C_{15}$ cycloalkyl group, and $R^{15}$ represents a hydrogen atom or a $C_6$ to $C_{is}$ alkyl, alkenyl, or alkinyl group; and as component A3) a compound according to formula (IV) or a mixture of compounds according to formula (IV)

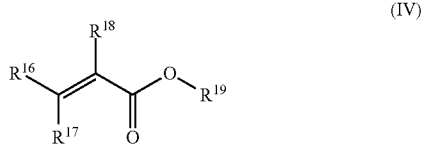

wherein $R^{16}$ and $R^{17}$ independently represent a hydrogen atom or a group of the formula —COOR$^{20}$, $R^{18}$ represents a hydrogen atom or a methyl group, $R^{19}$ represents a $C_{16}$ to $C_{30}$ alkyl, alkenyl, or alkinyl group or a $C_{16}$ to $C_{30}$ cycloalkyl group, and $R^{20}$ represents a hydrogen atom or a $C_{16}$ to $C_{30}$ alkyl, alkenyl, or alkinyl group.

Preferably, component A) is a mixture comprising 0 to 15% by weight of component A1) relative to the total weight of component A), 50 to 100% by weight of component A2) relative to the total weight of component A), and 0 to 50% by weight of component A3) relative to the total weight of component A), wherein the amounts of components A1) to A3) add up to 100% by weight relative to the total weight of component A).

In a particularly preferred embodiment, component A1) consists of a mixture of $C_1$ to $C_5$ (meth)acrylic acid esters, component A2) consists of a mixture of $C_6$ to $C_{15}$ (meth)acrylic acid esters, and component A3) consists of a mixture $C_{16}$ to $C_{30}$ (meth)acrylic acid esters.

The compounds according to formula (I) can be characterized based on their degree of linearity. In the context of the present invention the term "degree of linearity" refers to the amount of (meth)acrylic acid esters according to formula (I) having a linear alkyl, alkenyl, or alkinyl group as substituent $R^4$ relative to the total weight of (meth)acrylic acid esters according to formula (I). It has been found that the viscosity of the polymer composition can be decreased even further, if $R^4$ represents a linear alkyl, alkenyl, or alkinyl group. Therefore, in a preferred embodiment at least 30% by weight, more preferably at least 70% by weight, most preferably 100% by weight of the compounds according to formula (I) relative to the total weight of component A) have a linear alkyl, alkenyl, or alkinyl group as substituent $R^4$. The same applies to the substituents $R^9$, $R^{14}$ and $R^{19}$, correspondingly.

Non-limiting examples of compounds of formula (I) in general and of formula (II) in particular include methyl-(meth)acrylate, ethyl-(meth)acrylate, n-propyl-(meth)acrylate, iso-propyl-(meth)acrylate, n-butyl-(meth)acrylate, tert-butyl-(meth)acrylate, pentyl-(meth)acrylate, cyclopentyl-(meth)acrylate, 2-proynyl-(meth)acrylate, allyl-(meth)acrylate, vinyl-(meth)acrylate, dimethylfumarate, and maleate.

Non-limiting examples of compounds of formula (I) in general and of formula (III) in particular include hexyl-(meth)acrylate, 2-ethylhexyl-(meth)acrylate, heptyl-(meth)acrylate, 2-tert-butylheptyl-(meth)acrylate, octyl-(meth)acrylate, 3-isopropyl-heptyl-(meth)acrylate, nonyl-(meth)acrylate, decyl-(meth)acrylate, undecyl-(meth)acrylate, 5-methylundecyl-(meth)acrylate, dodecyl-(meth)acrylate, 2-methyldodecyl-(meth)acrylate, tridecyl-(meth)acrylate, 5-methyltridecyl-(meth)acrylate, tetradecyl-(meth)acrylate, pentadecyl-(meth)acrylate, oleyl-(meth)acrylate, 3-vinylcyclohexyl-(meth)acrylate, cyclohexyl-(meth)acrylate, bornyl-(meth)acrylate, and the corresponding fumarates and maleates.

Non-limiting examples of compounds of formula (I) in general and of formula (IV) in particular include hexadecyl-(meth)acrylate, 2-methylhexadecyl-(meth)acrylate, heptadecyl-(meth)acrylate, 5-isopropylheptadecyl-(meth)acrylate, 4-tert-butyloctadecyl-(meth)acrylate, 5-ethyloctadecyl-(meth)acrylate, 3-isopropyloctadecyl-(meth)acrylate, octadecyl-(meth)acrylate, nonadecyl-(meth)acrylate, eicosyl-(meth)acrylate, cetyleicosyl-(meth)acrylate, stearyleicosyl-(meth)acrylate, docosyl-(meth)acrylate, eicosyltetratriacontyl-(meth)acrylate, 2,4,5-tri-tert-butyl-3-vinyl-cyclohexyl-(meth)acrylate, 2,3,4,5-tetra-tert-butylcyclohexyl-(meth)acrylate, and the corresponding fumarates and maleates.

In a preferred embodiment component B) is a compound of formula (V) or a mixture of compounds of formula (V)

wherein $R^{21}$ is a $C_2$ to $C_{32}$ alkyl group.

$R^{21}$ is preferably a $C_6$ to $C_{20}$ alkyl group, more preferably a $C_6$ to $C_{12}$ alkyl group, most preferably a $C_8$ alkyl group.

Non-limiting examples of compounds of formula (V) include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-trocosene, 1-tetracosene, 1-pentacosene, 1-hexacosene, 1-heptacosene, 1-octacosene, 1-nonacosene, 1-triacontene, 1-hentriacontene, 1-dotriaconene.

The reaction mixture prepared in step a) may additionally comprise a solvent. The solvent may be selected according to the polarity of the monomers used. Suitable solvents include, for example, aromatic hydrocarbons such as, for example, benzene, toluene, and xylenes; ethers such as, for example, tetrahydrofuran, diethyl ether, ethylene glycol and polyethylene glycol monoalkyl and dialkyl ethers; alkyl esters of acetic, propionic and butyric acids; mixed ester-ethers, such as, for example, monoalkyl ether-monoalkanoate esters of ethylene glycol; ketones such as, for example, acetone, butanone, pentanone and hexanone; alcohols such as, for example, methanol, ethanol, propanol and butanol. Oils such as, for example, hydrocracked oil, petroleum oil, polyalphaolefins, esters or polymers of the present invention may also be used.

The Co(II) complex used in the inventive method acts as a catalytic chain transfer agent. By using a cobalt based catalytic chain transfer agent it has surprisingly been found that polymer compositions of extremely low viscosity can be produced. To achieve a kinematic viscosity of less than 25 mm$^2$/s at 100° C. according to ASTM D 445, the amount of Co(II) added to the reaction mixture in the form of a Co(II) complex is preferably 30 to 500 ppm by weight relative to the total weight of components A) and B), more preferably 30 to 100 ppm by weight, most preferably 50 to 100 ppm by weight.

Suitable examples of Co(II) complexes of the present invention include complexes comprising Co(II) and at least one of the ligands according to formulae (VI) to (XI)

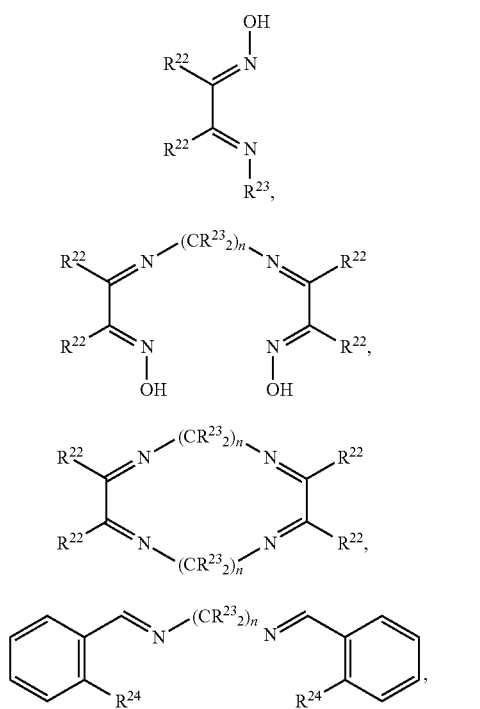

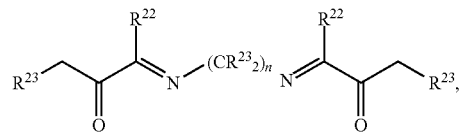

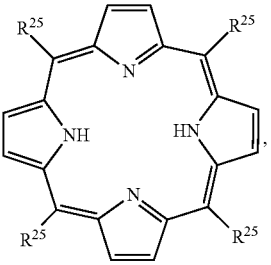

wherein each $R^{22}$ independently represents a phenyl group or a $C_1$ to $C_{12}$ alkyl group, or two $R^{22}$ on adjacent carbon atoms together represent a $C_5$ to $C_8$ alkylene group; each $R^{23}$ independently represents a hydrogen atom or a $C_1$ to $C_{12}$ alkyl group; each $R^{24}$ independently represents a hydroxyl group or an amino group; each $R^{25}$ independently represents a hydrogen atom, a $C_1$ to $C_{12}$ alkyl group, a phenyl group, a hydroxyphenyl group, or a $C_1$ to $C_4$ alkoxyphenyl group; and each n represents an integer 2 or 3.

In a particularly preferred embodiment the Co(II) complex comprises Co(II) and a ligand of formula (XI). More preferably, the Co(II) complex is 5,10,15,20-tetraphenylporphine Co(II).

The radical initiator used in the inventive method may be any free radical initiator suitable for use in radical polymerization reactions. Such radical initiators are well known in the art. Azo compounds are particularly preferred radical initiators.

The total amount of the radical initiator added to the reaction mixture is at least 0.05% by weight relative to the total weight of components A) and B), preferably in the range of 0.1 to 3.5% by weight relative to the total weight of components A) and B). It has surprisingly been found that by varying the amount of initiator, polymer compositions of different viscosity and different pour points may be produced. To achieve a particularly low viscosity, the total amount of initiator added to the reaction mixture is preferably 0.5 to 1.75% by weight relative to the total weight of components A) and B).

The radical initiator may be added to the reaction mixture in a step wise fashion to ensure that the radical initiator does not get depleted too quickly during long polymerization times. For example, a first dose of the radical initiator is added to the reaction mixture to start the polymerization reaction, then the reaction is allowed to proceed for a certain amount of time, then an additional dose initiator is added, and so on. The total amount added in all steps, however, should not exceed the preferred total amount of radical initiator mentioned above. The time interval between the addition of different doses of radical initiator may be in the range of 10 minutes to 5 hours, preferably 30 to 60 minutes.

Examples of suitable radical initiators include azo-compounds such as azobisisobutylonitrile (AIBN), 2,2'-Azobis (2-methylbutyronitrile), 2-(2-cyanobutan-2-yldiazenyl)-2-methylbutanenitrile, and 1,1-azobiscyclohexanecarbonitrile; peroxy compounds such as methyl-ethyl-ketone peroxide, acetylacetone peroxide, dilauryl peroxide, tert-butyl per-2-ethylhexaneoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl-peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, and bis(4-tert-butylcyclohexyl) peroxydicarbonate; and mixtures of the aforementioned compounds.

The reaction mixture may be reacted in step d) at standard ambient pressure, reduced pressure or elevated pressure. The reaction temperature may in the range of –20° C. to 200° C., preferably 50° C. to 160° C., more preferably 80° C. to 160° C.

In a preferred embodiment, the addition of the radical initiator in step c) and the reaction in step d) take place in an inert gas atmosphere to prevent degradation of the radical initiator. Preferably, nitrogen gas is used as inert gas.

The reaction may be allowed to proceed in step d) for up to 12 hours, preferably for 10 minutes to 12 hours, more preferably for 1 to 6 hours.

In a particularly preferred embodiment of the present invention, the method comprises the steps of:
a) preparing a reaction mixture consisting of 50 to 90% by weight of component A) and 10 to 50% by weight of component B) relative to the total weight of components A) and B);
b) adding Co(II) in the form of a complex comprising Co(II) and a ligand according to formula (XI) at a concentration of 30 ppm to 100 ppm by weight of Co(II) relative to the total weight of components A) and B);
c) adding 0.1 to 3.5% by weight relative to the total weight of components A) and B) of a radical initiator in a step-wise fashion; and
d) reacting the reaction mixture at a temperature of 80° C. to 160° C. for 1 to 6 hours,
wherein component A) is a mixture consisting of
as component A1) 0 to 15% by weight of a $C_1$ to $C_5$ (meth)acrylic acid ester or a mixture of $C_1$ to $C_5$ (meth) acrylic acid esters relative to the total weight of component A),
as component A2) 50 to 100% by weight of a $C_6$ to $C_{15}$ (meth)acrylic acid ester or a mixture of $C_6$ to $C_{15}$ (meth) acrylic acid esters relative to the total weight of component A), and
as component A3) 0 to 50% by weight of a $C_{16}$ to $C_{30}$ (meth)acrylic acid esters or a mixture of $C_6$ to $C_{30}$ (meth)acrylic acid esters relative to the total weight of component A);
and wherein component B) is a compound according to formula (V) or a mixture of compounds according to formula (V) wherein $R^{21}$ is $C_6$ to $C_{12}$ alkyl group.

In a second aspect, the present invention relates to the polymer composition obtained by the method as defined above. It has been found that with the inventive method, polymers with a kinematic viscosity of less than 25 mm²/s, measured at 100° C. according to ASTM D 445 can be prepared. This result is even more surprising as it has been observed that polymers which are prepared by CCT polymerization using cobalt(II) as a catalytic chain transfer agent, but without the presence of a 1-alkene component, have kinematic viscosity values which quickly reach a plateau, even by increasing the amount of cobalt catalytic chain transfer agent, and which are not getting to a lower kinematic viscosity value than 40 mm²/s at 100° C. according to ASTM D 445 (see below Examples 6 to 9 in Table 1 and Table 1 continued). On the contrary, the inventive method, combining CCT polymerization using cobalt(II) as a catalytic chain transfer agent in the presence of a 1-alkene component, surprisingly allows preparing polymer compositions with special properties, namely, a kinematic viscosity of less than 25 mm²/s measured at 100° C. according to ASTM D 445 (Examples 2 to 5 in Table 1).

In a third aspect, the present invention relates to the use of the polymer composition obtained by the claimed method as a lubricant base fluid for lubricants.

In a fourth aspect, the present invention relates to a lubricant base fluid comprising the polymer composition obtained by the claimed method.

In a fifth aspect, the present invention relates to the use of a Co(II) complex as catalytic chain transfer agent for the polymerization of a reaction mixture comprising an ethylenically unsaturated monomer or a mixture of ethylenically unsaturated monomers, a radical initiator, and a 1-alkene or a mixture of 1-alkenes, wherein the total amount of the radical initiator added to the reaction mixture is at least 0.05% by weight relative to the total weight of the ethylenically unsaturated monomer or mixture of ethylenically unsaturated monomers and the 1-alkene or mixture of 1-alkenes. The ethylenically unsaturated monomer and 1-alkene correspond to components A) and B) as described above. The Co(II) complex and radical initiator may be any of the Co(II) complexes and radical initiators described above. According the fifth aspect of the invention, the Co(II) complex may be used as catalytic chain transfer agent to prepare extremely low-viscosity polymers.

The method for the preparation of a polymer composition is the method to prepare a polymer composition as described above. The Co(II) complex that is used as catalyst is the Co(II) complex as described above.

EXAMPLES

In the following examples, Isodecyl-methacrylate (IDMA) is a mixture consisting of 98.7% by weight $C_{10}$ methacrylate, 0.8% by weight $C_{12}$ methacrylate, and 0.5% by weight $C_{14}$ methacrylate. The degree of linearity of IDMA is approximately 0%.

Methacrylate from LIAL® 125 alcohol (LIMA) is a mixture consisting of 24.3% by weight $C_{12}$ methacrylate, 29.4% by weight $C_{13}$ methacrylate, 28.4% by weight $C_{14}$ methacrylate, and 17.9% by weight $C_{15}$ methacrylate. The degree of linearity of LIMA is approximately 40%.

Lauryl methacrylate (LMA) is a mixture consisting of 72.2% by weight $C_{12}$ methacrylate, and 27.8% by weight $C_{14}$ methacrylate. The degree of linearity of LIAL is approximately 100%.

Example 1

Comparative Example

Example 1 is equal to Example 1 as disclosed in U.S. Pat. No. 5,691,284 and was prepared as follows:

141 g of 1-decene was heated to 160° C. in a reaction vessel. A mixture of 113 g of IDMA and 135 g of LIMA was fed in over 4 hours. At the end of the feed, the batch was polymerized for another 12 hours. During the entire reaction time of 16 hours, with the exception of the last hour, di-tert-butyl peroxide was added at 30-minute intervals (here, 30 portions, total amount 2.8% by weight relative to the total weight of 1-decene and methacrylate monomers).

Example 2

109 g of 1-decene, 87 g of IDMA, and 104 g of LIMA were charged into a 500 mL 4-necked round bottom flask. 0.225 g of 5,10,15,20-Tetraphenyl Porphine Cobalt(II) was then added to the flask. The contents of the flask were mixed using an overhead stirrer, inerted with nitrogen, and heated to 140° C. Once the mixture reached temperature and the cobalt catalyst appeared to be dissolved, 2.8 g of initiator solution comprising 50% by weight 2,2-bis-tert-butyl-peroxybutane was added to the flask using a syringe through a rubber septum. The reaction was allowed to proceed for 30 minutes. Five additional shots of 2.8 g of initiator solution were added 30 minutes apart.

Residual monomer was measured by gas chromatography on the resultant polymers to ensure full monomer conversion.

Residual amounts of unreacted 1-decene were removed by via rotary evaporation at 100° C. and less than 15 mm Hg pressure.

Example 3

109 g of 1-decene, 87 g of IDMA, and 104 g of LIMA were charged into a 500 mL 4-necked round bottom flask. 0.225 g of 5,10,15,20-Tetraphenyl Porphine Cobalt(II) was then added to the flask. The contents of the flask were mixed using an overhead stirrer, inerted with nitrogen, and heated to 140° C. Once the mixture reached temperature and the cobalt catalyst appeared to be dissolved, 1.1 g of initiator solution comprising 50% by weight 2,2-bis-tert-peroxybutane was added to the flask using a syringe through a rubber septum. The reaction was allowed to proceed for 30 minutes. Five additional shots of 1.1 g of initiator solution were added 30 minutes apart.

Residual monomer was measured by gas chromatography on the resultant polymers to ensure full monomer conversion.

Residual amounts of unreacted 1-decene were removed by via rotary evaporation at 100° C. and less than 15 mm Hg pressure.

Example 4

90 g of 1-decene and 210 g of LMA were charged into a 500 mL 4-necked round bottom flask. 0.225 g of 5,10,15,20-Tetraphenyl Porphine Cobalt(II) was then added to the flask. The contents of the flask were mixed using an overhead stirrer, inerted with nitrogen, and heated to 140° C. Once the mixture reached temperature and the cobalt catalyst appeared to be dissolved, 1.1 g of initiator solution comprising 50% by weight 2,2-bis-tert-butyl-peroxybutane was added to the flask using a syringe through a rubber septum. The reaction was allowed to proceed for 30 minutes. Five additional shots of 1.1 g of initiator solution were added 30 minutes apart.

Residual monomer was measured by gas chromatography on the resultant polymers to ensure full monomer conversion.

Residual amounts of unreacted 1-decene were removed by via rotary evaporation at 100° C. and less than 15 mm Hg pressure

Example 5

90 g of 1-decene and 210 g of LMA were charged into a 500 mL 4-necked round bottom flask. 0.225 g of 5,10,15, 20-Tetraphenyl Porphine Cobalt(II) was then added to the flask. The contents of the flask were mixed using an overhead stirrer, inerted with nitrogen, and heated to 140° C. Once the mixture reached temperature and the cobalt catalyst appeared to be dissolved, 1.1 g of initiator solution comprising 50% by weight of 2,2-bis-tert-butyl-peroxybutane was added to the flask using a syringe through a rubber septum. The reaction was allowed to proceed for 30 minutes. Five additional shots of 1.1 g of initiator solution were added 30 minutes apart.

Residual monomer was measured by gas chromatography on the resultant polymers to ensure full monomer conversion.

Residual amounts of unreacted 1-decene were removed by via rotary evaporation at 100° C. and less than 15 mm Hg pressure

Comparative Example 6

250 g of LMA were charged into a 500 mL 4-necked round bottom flask. 0.188 g of 5,10,15,20-Tetraphenyl Porphine Cobalt(II) was then added to the flask. The contents of the flask were mixed using an overhead stirrer, inerted with nitrogen, and heated to 90° C. Once the mixture reached temperature and the cobalt catalyst appeared to be dissolved, 1 g of initiator solution comprising 25% by weight 2-(2-cyanobutan-2-yldiazenyl)-2-methylbutanenitrile (Vazo67) in diisobutyl ketone was added to the flask using a syringe through a rubber septum. The reaction was allowed to proceed for 60 minutes. Two additional shots of 1 g of initiator solution were added 60 minutes apart. The reaction was allowed to hold for one hour after the final addition of initiator.

Measurements of Viscosity, Molecular Weight, and Sonic Shear Stability

The kinematic viscosities of the polymers were measured according to ASTM D 445. The polymer molecular weights were measured by gel permeation chromatography (GPC) calibrated using poly(methyl-methacrylate) standards. The sonic shear stability was determined according to ASTM D 5621. The pour point was determined according to ASTM D 6749. The viscosity index was determined according to ASTM D 2270.

Examples 2 to 5 demonstrate that the use of a cobalt based catalytic chain transfer agent for the polymerization of methacrylate and 1-alkene monomers yields polymers with a kinematic viscosity of less than 25 mm$^2$/s measured at 100° C. according to ASTM D 445 (table 1). Comparative example 1 demonstrates that this is not achievable without the cobalt based chain transfer agent. An additional beneficial feature when using the method of the present invention is a greater efficiency of the 1-decene to reduce viscosity, such that only half the charge of 1-decene is required in example 5 as compared to comparative example 1. These features demonstrate the utility of the inventive method to enable the preparation of polymers with lower viscosities and a high methacrylate to 1-alkene ratio.

Molecular weight data show that the extremely low molecular weight methacrylate-decene polymers of examples 2 to 5 have a degree of polymerization of about 5, whereas previous cobalt based catalytic chain transfer polymerizations of lauryl-methacrylate without the alpha-olefin comonomer showed an average degree of polymerization of about 9. A direct comparison of example 4 and comparative example 6 shows the impact of incorporating 1-decene in the presence of a cobalt based catalytic chain transfer agent on polymer $M_w$ (from 4400 g/mol to 1800 g/mol) and product viscosity at 100° C. (from 40 mm²/s to 9 mm²/s). Indeed, it was observed that polymers which are prepared by CCT polymerization using cobalt(II) as a catalytic chain transfer agent, but without the presence of a 1-alkene component, have kinematic viscosity values which quickly reach a plateau, even by increasing the amount of cobalt catalytic chain transfer agent, and which are not getting to a lower kinematic viscosity value than 40 mm²/s at 100° C. according to ASTM D 445 (see below Examples 6 to 9 in Table 1 and Table 1 continued). Said decreasing activity of the Cobalt catalytic transfer agent was also observed and commented in the publication Smirnov et al, *Polym. Sci.* 1981, A23, 1158.

On the contrary, the inventive method, combining CCT polymerization using cobalt(II) as a catalytic chain transfer agent in the presence of a 1-alkene component, surprisingly allows preparing polymer compositions with special properties, namely, a kinematic viscosity of less than 25 mm²/s measured at 100° C. according to ASTM D 445 (Examples 2 to 5 in Table 1).

The direct comparison of examples 2 and 3 shows that a reduction in the amount of radical initiator yields a lower viscosity of the product polymers. This is contrary to what is normally observed in free radical polymerization, where a reduction in polymerization initiator typically results in higher viscosity. This effect is beneficial in helping reduce the overall amount of initiator by-products that may be present in the product polymer. Examples 2 and 3 also show that a reduction in the amount of radical initiator lowers the pour point of the product polymer.

As the different pour points of examples 2 to 5 indicate, the pour point may also be tuned by varying the composition of the monomer mixture, in particular by varying the amount of 1-alkene.

TABLE 1

Viscosimetric data of examples 1 to 6. The amounts given are relative to the total weight of the sum of 1-decene and the methacrylate monomers.

|  | Example | | | | | |
|---|---|---|---|---|---|---|
|  | 1 | 2 | 3 | 4 | 5 | 6 |
| 1-decene [% by weight] | 36 | 36 | 36 | 30 | 30 | 0 |
| $C_{10}$ methacrylate [% by weight] | 29 | 29 | 29 | 0 | 0 | 0 |
| $C_{12}$ methacrylate [% by weight] | 9 | 9 | 9 | 51 | 51 | 72 |
| $C_{13}$ methacrylate [% by weight] | 10 | 10 | 10 | 0 | 0 | 0 |
| $C_{14}$ methacrylate [% by weight] | 10 | 10 | 10 | 19 | 19 | 28 |
| $C_{15}$ methacrylate [% by weight] | 6 | 6 | 6 | 0 | 0 | 0 |
| Co(II) [ppm by weight] | 0 | 66 | 66 | 66 | 66 | 66 |
| Initiator [% by weight] | 2.8 | 2.8 | 1.1 | 1.1 | 1.1 | 0.3 |
| $M_W$ [kg/mol] | 4.0 | 2.4 | 1.8 | 1.8 | 1.8 | 4.4 |
| Kinematic viscosity at 100° C. [mm²/s] | 45.1 | 19.6 | 11.6 | 9.07 | 9.10 | 40 |
| Kinematic viscosity at 40° C. [mm²/s] | 489 | 176 | 84.1 | 54.5 | 52.7 | 437 |
| Viscosity Index | 146 | 128 | 129 | 147 | 154 | 140 |
| Pour point [° C.] | −43.2 | −39 | −48 | −27 | −27 | ND |

|  | Example | | |
|---|---|---|---|
|  | 7 | 8 | 9 |
| 1-decene [% by weight] | 0 | 0 | 0 |
| $C_{10}$ methacrylate [% by weight] | 0 | 0 | 0 |
| $C_{12}$ methacrylate [% by weight] | 72 | 72 | 72 |
| $C_{13}$ methacrylate [% by weight] | 0 | 0 | 0 |
| $C_{14}$ methacrylate [% by weight] | 28 | 28 | 28 |
| $C_{15}$ methacrylate [% by weight] | 0 | 0 | 0 |
| Co(II) [ppm by weight] | 26 | 40 | 162 |
| Initiator [% by weight] | 0.3 | 0.3 | 0.3 |
| $M_W$ [kg/mol] | 10.6 | 6.2 | 4.4 |
| Kinematic viscosity at 100° C. [mm²/s] | 192 | 75 | 40 |
| Kinematic viscosity at 40° C. [mm²/s] |  |  |  |
| Viscosity Index |  |  |  |
| Pour point [° C.] |  |  |  |

Table 2 shows the properties of two commercially available group IV polyalphaolefin base oils (Spectrasyn® 10) and ester-based fluids (Esterex® TM101) in comparison to examples 3 and 4. The data show that examples 3 and 4 deliver viscosity indices greater than those of the commercial products, and are able to provide base fluids with excellent pour points.

TABLE 2

Comparison of commercial base fluids to examples 3 and 4.

| Product | Spectrasyn® 10 | Esterex® TM101 | Example 3 | Example 4 |
|---|---|---|---|---|
| Kinematic viscosity at 100° C. [mm²/s] | 10 | 9.8 | 11.6 | 9.07 |
| Kinematic viscosity at 40° C. [mm²/s] | 66 | 89 | 84.1 | 54.5 |
| Viscosity Index | 137 | 86 | 129 | 147 |
| Pour Point [° C.] | −48 | −36 | −48 | −27 |

The invention claimed is:
1. A method for preparing a polymer composition, said method comprising:
  preparing a reaction mixture comprising a component A) and a component B), wherein component A) is an ethylenically unsaturated monomer having a formula (I) or a mixture of ethylenically unsaturated monomers each having a formula (I):

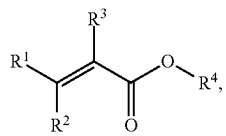
(I)

wherein $R^1$ and $R^2$ each independently represent a hydrogen atom or a group of the formula —COOR$^5$, $R^3$ represents a hydrogen atom or a methyl group, $R^4$ represents a $C_1$ to $C_{30}$ alkyl group, a $C_2$ to $C_{30}$ alkenyl group, a $C_2$ to $C_{30}$ alkynyl group or a $C_3$ to $C_{30}$ cycloalkyl group, and $R^5$ represents a hydrogen atom or a $C_1$ to $C_{30}$ alkyl group, a $C_2$ to $C_{30}$ alkenyl group, or a $C_2$ to $C_{30}$ alkynyl group, and component B) is a 1-alkene or a mixture of 1-alkenes selected from the group consisting of 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 1-hentriacontene, and 1-dotriaconene;

adding a Co(II) complex as a catalytic chain transfer agent to the reaction mixture;

adding a radical initiator; and reacting the reaction mixture to obtain a polymer composition having a kinematic viscosity of less than 25 mm$^2$/s measured at 100° C. according to ASTM D 445, wherein a total amount of the radical initiator added to the reaction mixture is at least 0.05% by weight relative to a total weight of components A) and B).

2. The method according to claim 1, wherein the reaction mixture comprises at least 50% by weight of component A) relative to the total weight of components A) and B).

3. The method according to claim 1, wherein the reaction mixture comprises at least 10% by weight of component B) relative to the total weight of components A) and B).

4. The method according to claim 1, wherein the Co(II) complex comprises Co(II) and at least one of the ligands according to formulae (VI) to (XI)

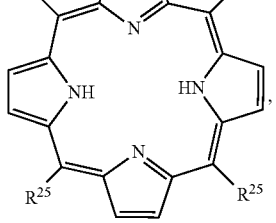
(VI)

(VII)

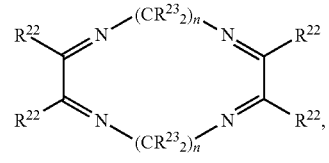
(VIII)

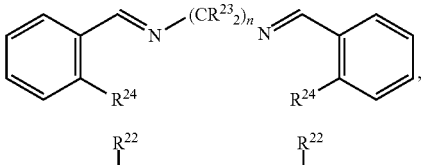
(IX)

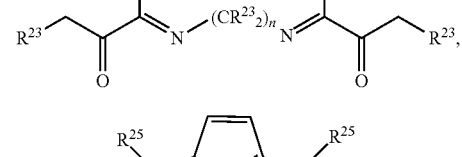
(X)

(XI)

wherein each $R^{22}$ independently represents a phenyl group or a $C_1$ to $C_{12}$ alkyl group, or two $R^{22}$ on adjacent carbon atoms together represent a $C_5$ to $C_8$ alkylene group; each $R^{23}$ independently represents a hydrogen atom or a $C_1$ to $C_{12}$ alkyl group; each $R^{24}$ independently represents a hydroxyl group or an amino group; each $R^{25}$ independently represents a hydrogen atom, a $C_1$ to $C_{12}$ alkyl group, a phenyl group, a hydroxyphenyl group, or a $C_1$ to $C_4$ alkoxyphenyl group; and each n represents an integer 2 or 3.

5. The method according to claim 1, wherein the amount of Co(II) added to the reaction mixture is from 30 to 500 ppm by weight relative to the total weight of components A) and B).

6. The method according to claim 1, wherein a total amount of radical initiator added to the reaction mixture is from 0.1 to 3.5% by weight relative to the total weight of components A) and B).

7. The method according to claim 1, wherein component B) comprises 1-decene.

8. The method according to claim 1, wherein component A) comprises a mixture of $C_{12}$- and $C_{14}$-methacrylates.

9. The method according to claim 8, wherein component B) comprises 1-decene.

10. The method according to claim 1, wherein component A) comprises a mixture of $C_{10}$-, $C_{12}$-, $C_{13}$-, $C_{14}$- and $C_{15}$-methacrylates.

11. The method according to claim 10, wherein component B) comprises 1-decene.

12. The method according to claim 11, wherein the Co(II) complex comprises 5,10,15,20-tetraphenyl porphine cobalt (II).

13. The method according to claim 1, wherein the Co(II) complex comprises 5,10,15,20-tetraphenyl porphine cobalt (II).

14. A process, comprising polymerizing a reaction mixture with a Co(II) complex as catalytic chain transfer agent, to obtain a polymer composition having a kinematic viscosity of less than 25 mm²/s measured at 100° C. according to ASTM D 445, wherein the reaction mixture comprises an ethylenically unsaturated monomer or a mixture of ethylenically unsaturated monomers, a radical initiator, and a 1-alkene or a mixture of 1-alkenes selected from the group consisting of 1-butene, 1-pentene, 1-hexene, 1-heptene, 1-octene, 1-nonene, 1-decene, 1-undecene, 1dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 1-hentriacontene, and 1-dotriaconene, wherein a total amount of the radical initiator added to the reaction mixture is at least 0.05% by weight relative to a total weight of the ethylenically unsaturated monomer or mixture of ethylenically unsaturated monomers and the 1-alkene or mixture of 1-alkenes, and wherein the ethylenically unsaturated monomer has a formula (I) or the mixture of ethylenically unsaturated monomers has a formula (I):

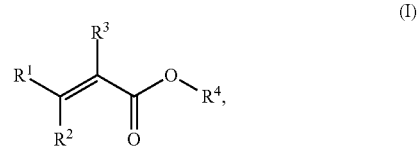

(I)

wherein $R^1$ and $R^2$ each independently represent a hydrogen atom or a group of the formula —COOR$^5$, $R^3$ represents a hydrogen atom or a methyl group, $R^4$ represents a $C_1$ to $C_{30}$ alkyl group, a $C_2$ to $C_{30}$ alkenyl group, a $C_2$ to $C_{30}$ alkynyl group or a $C_3$ to $C_{30}$ cycloalkyl group, and $R^5$ represents a hydrogen atom or a $C_1$ to $C_{30}$ alkyl group, a $C_2$ to $C_{30}$ alkenyl group, or a $C_2$ to $C_{30}$ alkynyl group.

* * * * *